(12) United States Patent
Kajita

(10) Patent No.: US 12,091,282 B2
(45) Date of Patent: Sep. 17, 2024

(54) CONTROL DEVICE FOR ELEVATOR

(71) Applicant: Mitsubishi Electric Corporation, Tokyo (JP)

(72) Inventor: Jun Kajita, Inazawa (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1339 days.

(21) Appl. No.: 16/495,388

(22) PCT Filed: May 18, 2017

(86) PCT No.: PCT/JP2017/018707
§ 371 (c)(1),
(2) Date: Sep. 19, 2019

(87) PCT Pub. No.: WO2018/211665
PCT Pub. Date: Nov. 22, 2018

(65) Prior Publication Data
US 2020/0071122 A1    Mar. 5, 2020

(51) Int. Cl.
*B66B 1/30* (2006.01)
*B66B 1/34* (2006.01)
*H02M 5/458* (2006.01)

(52) U.S. Cl.
CPC .............. *B66B 1/308* (2013.01); *B66B 1/34* (2013.01); *H02M 5/4585* (2013.01)

(58) Field of Classification Search
CPC ........... B66B 1/30; B66B 5/027; B66B 1/308; B66B 1/06; B66B 1/00; B66B 5/028; B66B 5/0018; B66B 5/0006
See application file for complete search history.

(56) References Cited

U.S. PATENT DOCUMENTS

2001/0017236 A1 *  8/2001  Tominaga ................ B66B 1/30
                                                        187/290
2020/0071122 A1 *  3/2020  Kajita ..................... B66B 1/30

FOREIGN PATENT DOCUMENTS

| IN | 201504310 I1 | * | 10/2016 |
| JP | 58-167371 A | | 10/1983 |
| JP | 3-79573 A | | 4/1991 |
| JP | 4-365766 A | | 12/1992 |
| JP | 2009-12929 A | | 1/2009 |
| JP | 2011-32055 A | | 2/2011 |

(Continued)

OTHER PUBLICATIONS

International Search Report and Written Opinion mailed on Aug. 8, 2017 for PCT/JP2017/018707 filed on May 18, 2017, 8 pages including English Translation of the International Search Report.

(Continued)

*Primary Examiner* — Marlon T Fletcher
(74) *Attorney, Agent, or Firm* — XSENSUS LLP

(57) ABSTRACT

Provided is a control device for an elevator, including: a first power converter; a second power converter; and switching means. The switching means being configured to selectively achieve: a first circuit configuration that causes the first power converter to operate as the regenerative converter, and also causes the second power converter to operate as the inverter; and a second circuit configuration that causes the second power converter to operate as the regenerative converter, and also causes the first power converter to operate as the inverter.

7 Claims, 3 Drawing Sheets

(56) References Cited

FOREIGN PATENT DOCUMENTS

| JP | 2011-032055 | A |   | 2/2011 |           |
|----|-------------|---|---|--------|-----------|
| JP | 2013-23357  | A |   | 2/2013 |           |
| JP | 2014009041  | A | * | 1/2014 |           |
| JP | 2016190714  | A | * | 11/2016|           |
| WO | WO-2007061419 | A1 | * | 5/2007 | ............. B66B 1/308 |
| WO | WO-2010019122 | A1 | * | 2/2010 | ............. B66B 1/302 |
| WO | 2014/030194 | A1 |   | 2/2014 |           |
| WO | WO-2015094233 | A1 | * | 6/2015 | ............. B66B 1/302 |
| WO | WO-2018211665 | A1 | * | 11/2018 | ............... B66B 1/30 |
| WO | WO-2019234843 | A1 | * | 12/2019 |           |

OTHER PUBLICATIONS

Office Action issued on Feb. 16, 2021, in corresponding German patent Application No. 11 2017 007 554.8, 11 pages.

* cited by examiner

CONTROL DEVICE FOR ELEVATOR

CROSS-REFERENCE TO RELATED APPLICATIONS

The present application is based on PCT filing PCT/JP2017/018707, filed May 18, 2017, the entire contents of which are incorporated herein by reference.

TECHNICAL FIELD

The present invention relates to a control device for an elevator.

BACKGROUND ART

In Patent Literature 1, there is disclosed an example of a related-art control device for an elevator. In the example of Patent Literature 1, the control device includes: a rectifier circuit configured to convert AC power from an AC power supply to DC power; a smoothing capacitor configured to smoothen pulsating components of the DC power thus converted in the rectifier circuit; an inverter configured to convert the smoothed DC power into variable-voltage variable-frequency AC power to output the resultant power; a motor driven by the AC power output from the inverter so as to lift or lower a car; a fan configured to air-cool the inverter; voltage measurement means configured to measure voltage of an element in an inverter device; and fan control means configured to control a fan rotational speed so as to increase an air-cooling property of the fan when a voltage value measured by the voltage measurement means meets a predetermined condition after the start of test driving of a switching element in the inverter. Note that, the predetermined condition indicates an occurrence of any abnormality in the switching element in the inverter.

CITATION LIST

Patent Literature

[PTL 1] JP 2013-23357 A

SUMMARY OF INVENTION

Technical Problem

However, the inventor of the present invention has found that the control device for an elevator, which includes an inverter and a regenerative converter, has a problem about a large difference in service life between the inverter and the regenerative converter.

For example, when the car of the elevator is often accelerated or decelerated, the inverter receives a larger stress than the converter to reduce a service life thereof. This may possibly influence a service life of the entire control device.

The present invention has been made with a view to solving the above-mentioned problem, and it is therefore an object of the present invention to provide a control device for an elevator, which can reduce a difference in service life between an inverter and a regenerative converter.

Solution to Problem

According to one embodiment of the present invention, there is provided a control device for an elevator, including: a first power converter; a second power converter; and switching means, the first power converter being operable as a regenerative converter, the first power converter being operable as an inverter, the second power converter being operable as a regenerative converter, the second power converter being operable as an inverter, the regenerative converter having a function of converting power to DC power and a function of converting DC power to power, the inverter having: a function of converting DC power to AC power; a function of supplying the AC power to an electric power generator; a function of receiving regenerated power from the electric power generator; and a function of converting the regenerated power to DC power, the switching means being configured to selectively achieve: a first circuit configuration that causes the first power converter to operate as the regenerative converter, and also causes the second power converter to operate as the inverter; and a second circuit configuration that causes the second power converter to operate as the regenerative converter, and also causes the first power converter to operate as the inverter.

According to a particular aspect of the present invention, the control device for an elevator further includes a first temperature detector configured to measure a temperature of the first power converter or a second temperature detector configured to measure a temperature of the second power converter, the switching means being configured to selectively achieve the first circuit configuration and the second circuit configuration based on the first temperature or the second temperature.

According to a particular aspect of the present invention, when: the second circuit configuration is achieved; the first temperature exceeds a first temperature threshold; and the motor generator is stopped, the switching means is configured to operate so as to achieve the first circuit configuration, or when: the first circuit configuration is achieved; the second temperature exceeds the first temperature threshold; and the electric power generator is stopped, the switching means is configured to operate so as to achieve the second circuit configuration.

According to a particular aspect of the present invention, at least one of the first power converter or the second power converter includes a switching element including a wide bandgap semiconductor.

Advantageous Effects of Invention

The control device for an elevator according to the present invention includes the two power converters, which are each allowed to switchingly operate as the inverter or the regenerative converter, with the result that the difference in service life between the two power converters (i.e., difference in service life between the inverter and the regenerative converter) can be reduced.

DESCRIPTION OF EMBODIMENTS

Now, embodiments of the present invention are described with reference to the drawings.

First Embodiment

Figure 1:
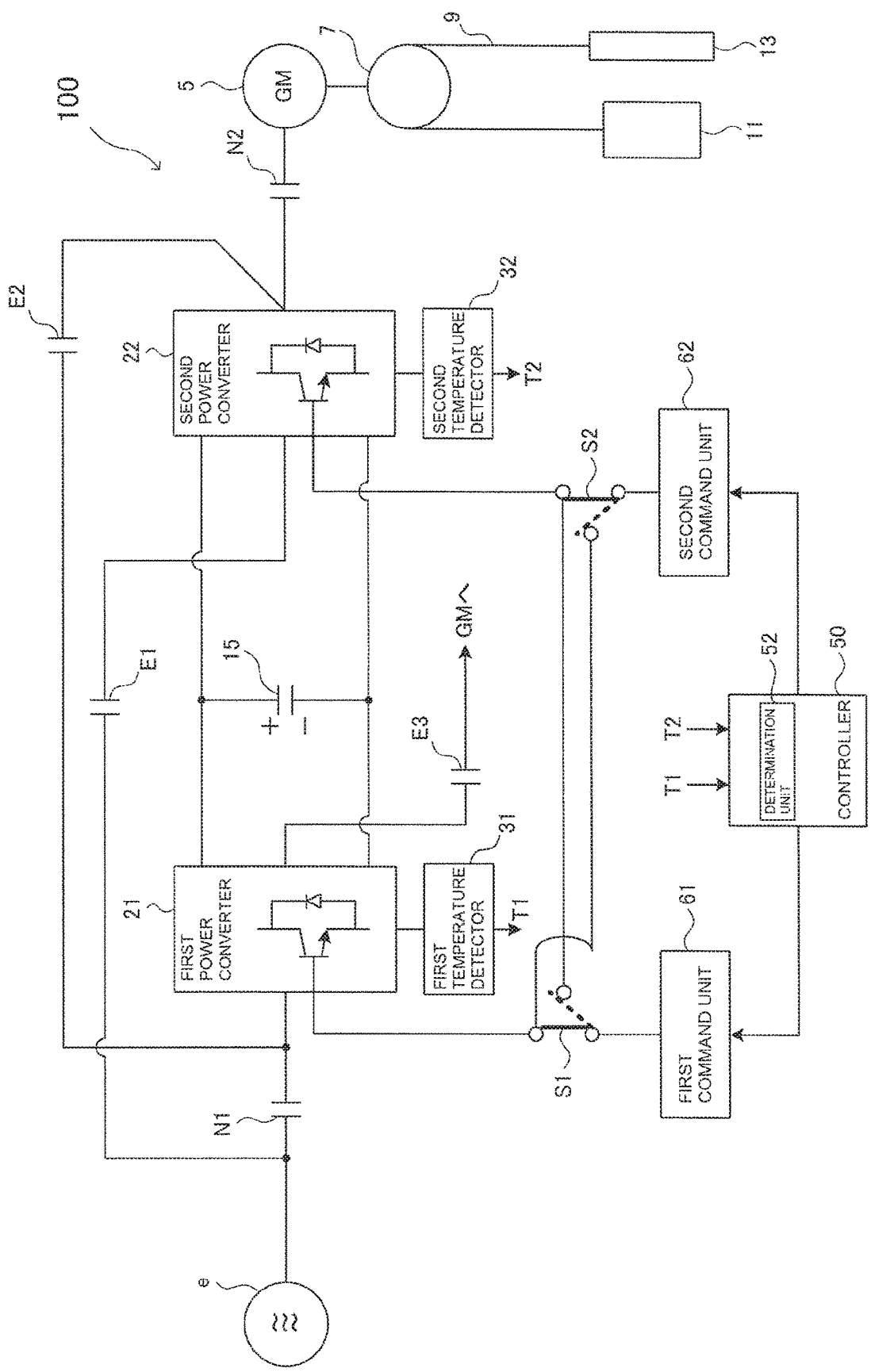
FIG. 1 is a diagram for illustrating a circuit example of a first embodiment of the present invention.

FIG. 1 is a diagram for illustrating a configuration including a control device 100 for an elevator according to a first embodiment of the present invention. The elevator includes, for example, an electric power generator 5, a hoisting machine 7, a main rope 9, a car 11, and a counterweight 13. The electric power generator 5 is configured to drive the hoisting machine 7. The main rope 9 is hung over a sheave of the hoisting machine 7. The main rope 9 is attached, at one end, to the car 11, and is attached, at another end, to the counterweight 13.

The control device 100 includes a first power converter 21 and a second power converter 22. The first power converter 21 and the second power converter 22 each include a switching element. In the first embodiment, the switching element of the first power converter 21 and the switching element of the second power converter 22 each include a wide bandgap semiconductor. As a modification example thereof, one or none of the two converters may include a wide bandgap semiconductor.

Further, the control device 100 includes an AC power supply e (as a modification example thereof, the AC power supply e may be provided outside the control device 100). The AC power supply e is, for example, a three-phase AC power supply.

In this specification, the terms "input side" and "output side" used in connection with the first power converter 21 and the second power converter 22 are defined based on a case in which the electric power generator 5 operates as an electric motor. Specifically, the term "input side" refers to a side from which power is input to the power converter when the electric power generator 5 is operating as an electric motor. In this case, when the electric power generator 5 is operating as a power generator, the power converter outputs power from this side. Further, the term "output side" refers to a side from which power is input to the power converter when the electric power generator 5 is operating as a power generator (e.g., during a regenerative operation). In this case, when the electric power generator 5 is operating as an electric motor, the power converter outputs power from this side.

Further, in this specification, the term "normal contact" refers to a contact configured to close when the control device 100 forms a predetermined circuit configuration (first circuit configuration). The term "switching contact" refers to a contact configured to close when the control device 100 forms another predetermined circuit configuration (second circuit configuration). When the control device 100 forms the first circuit configuration, the normal contact closes, and the switching contact opens. Meanwhile, when the control device 100 forms the second circuit configuration, the normal contact opens, and the switching contact closes. The normal contact and the switching contact may be interlocked so as not to open at the same time.

An input side of the first power converter 21 is connected to the AC power supply e via the normal contact N1. Further, the input side of the first power converter 21 is connected to an output side of the second power converter 22 via a switching contact E2.

An output side of the first power converter 21 is connected in parallel to a capacitor 15 and an input side of the second power converter 22. The capacitor 15 may function as a smoothing capacitor used to smoothen pulsating components of DC power. Further, the output side of the first power converter 21 is connected to the electric power generator 5 via a switching contact E3.

An input side of the second power converter 22 is connected to the AC power supply e via the switching contact E1. Further, the electric power generator 5 is connected to an output side of the second power converter 22 via a normal contact N2.

The first power converter 21 can operate both as a regenerative converter and as an inverter. The second power converter 22 can also operate both as a regenerative converter and as an inverter. Note that, in this specification, the converter is referred to as "regenerative converter" regardless of whether or not the converter is involved in the regenerative operation of the electric power generator 5.

The regenerative converter (i.e., the first power converter 21 and the second power converter 22, which operate as the regenerative converter) has a function of converting received power (e.g., AC power) into DC power, and a function of converting DC power to power (e.g., AC power). The regenerative converter may function as a rectifier circuit.

The inverter (i.e., the first power converter 21 and the second power converter 22, which operate as the inverter) has a function of converting DC power to AC power, a function of supplying AC power to the electric power generator 5, a function of receiving regenerated power from the electric power generator 5, and a function of converting regenerated power to DC power. The inverter may be configured to produce AC power having at least one of variable voltage and a variable frequency.

The operations of the first power converter 21 and the second power converter 22 are switched in accordance with the circuit configuration of the control device 100. The control device 100 includes switching means used to switch the circuit configurations of the control device 100. In the first embodiment, the switching means includes a controller 50, a first command unit 61, a second command unit 62, a first signal switch S1, and a second signal switch S2. The controller 50 includes a determination unit 52. The determination unit 52 is configured by, for example, a computer including calculation means and storage means.

The controller 50 controls operations of the first command unit 61 and the second command unit 62. The first command unit 61 outputs a control command signal that causes the power converter to operate as the inverter. The second command unit 62 outputs a control command signal that causes the power converter to operate as the regenerative converter. Those control command signals are selectively input to the first power converter 21 or the second power converter 22 in accordance with a state of each of the first signal switch S1 and the second signal switch S2.

The switching means can selectively achieve the first circuit configuration or the second circuit configuration. The selection can be made in accordance with, for example, states of the first signal switch S1, the second signal switch S2, the normal contacts N1 and N2, and the switching contacts E1 to E3. The controller 50 may control the state of the respective components.

In the first circuit configuration, the first command unit 61 is connected to the second power converter 22, and the second command unit 62 is connected to the first power converter 21. Specifically, the first circuit configuration is one that allows the first power converter 21 to operate as the regenerative converter, and allows the second power converter 22 to operate as the inverter.

In the second circuit configuration, the first command unit 61 is connected to the first power converter 21, and the second command unit 62 is connected to the second power converter 22. Specifically, the second circuit configuration is one that allows the second power converter 22 to operate as the regenerative converter, and allows the first power converter 21 to operate as the inverter.

In the first embodiment, the control device 100 includes a first temperature detector 31 and a second temperature detector 32. The first temperature detector 31 measures a temperature of the first power converter 21, and outputs a first temperature detection value T1 indicative of the measured temperature. The second temperature detector 32 measures a temperature of the second power converter 22, and outputs a second temperature detection value T2 indicative of the measured temperature. The first temperature detection value T1 and the second temperature detection value T2 are input to the controller 50.

In the first embodiment, the switching means operates based on the first temperature detection value T1 and the second temperature detection value T2. For example, the switching means selectively achieves the first circuit configuration or the second circuit configuration based on the first temperature detection value T1 and the second temperature detection value T2. Further, in the first embodiment, the switching means (especially, the determination unit 52 of the controller 50) is configured to store a predetermined temperature threshold (i.e., a first temperature threshold and a second temperature threshold) used for control of the circuit configuration.

An operation of the thus-configured control device 100 is described below.

Figure 2:
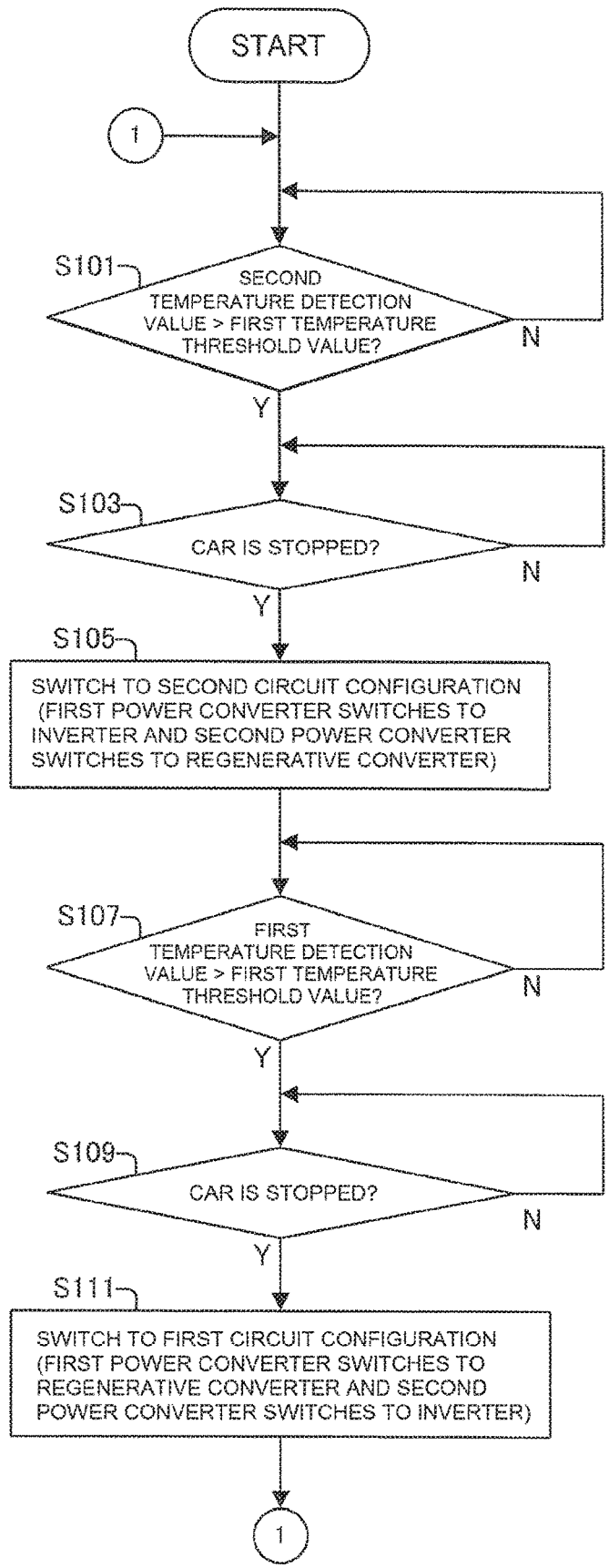
FIG. 2 is a flowchart for illustrating a processing flow of the first embodiment.

FIG. 2 is a flowchart for illustrating a processing flow executed by the controller 50 of the first embodiment. The processing flow of the flowchart is executed, for example, when the first circuit configuration is achieved.

In the first circuit configuration, the normal contacts N1 and N2 are in an on state, the switching contacts E1 to E3 are in an off state, the first signal switch S1 is switched to the second power converter 22 side, and the second signal switch S2 is switched to the first power converter 21 side. In this state, the first power converter 21 operates as the regenerative converter to receive power from the AC power supply e, and the second power converter 22 operates as the inverter to drive the electric power generator 5.

By the electric power generator 5 being driven in response to a call, the car 11 is lifted or lowered to a target floor. Specific control therefor can be executed based on any known technology.

As described above, in the first circuit configuration, the second power converter 22 operates as the inverter. In this state, the temperature (second temperature detection value T2) of the second power converter 22 is more liable to increase than the temperature (first temperature detection value T1) of the first power converter 21.

That is, in this configuration, the first power converter 21 is at a lower temperature than that in the second circuit configuration, and an adverse effect on a service life of the first power converter 21 can be suppressed. In another aspect, there is a fear that the second power converter 22 is at a higher temperature than that in the second circuit configuration, and an adverse effect on a service life of the second power converter 22 is further increased.

First, the controller 50 determines whether or not the second temperature detection value T2 (indicative of the inverter temperature) exceeds the first temperature threshold (Step S101). When the second temperature detection value T2 is equal to or less than the first temperature threshold, the controller 50 repeats the process of Step S101.

When the second temperature detection value T2 exceeds the first temperature threshold, the controller 50 determines whether or not the car 11 is stopped (Step S103). Whether or not the car 11 is stopped can be determined based on whether or not the electric power generator 5 is stopped. When the electric power generator 5 is not stopped (e.g., when the car 11 is moving), the controller 50 repeats the process of Step S103.

When the electric power generator 5 is stopped, the second circuit configuration is achieved by the controller 50 (Step S105). Specifically, the normal contacts N1 and N2 are switched off, the switching contacts E1 to E3 are switched on, the first signal switch S1 is switched to the first power converter 21 side, and the second signal switch S2 is switched to the second power converter 22 side. That is, the controller causes the second power converter 22 to switch from the inverter to the regenerative converter. Thus, the first power converter 21 is ready to operate as the inverter, and the second power converter 22 is also ready to operate as the regenerative converter.

As described above, when the first circuit configuration is achieved, and the second temperature detection value T2 exceeds the first temperature threshold, and the electric power generator 5 is stopped, the switching means of the control device 100 can operate to achieve the second circuit configuration. Any other conditions can be added in accordance with specific control thereof.

When a call is made in this state, the second power converter 22 operates as the regenerative converter to receive power from the AC power supply e, and the first power converter 21 operates as the inverter to drive the electric power generator 5. In this state, the second power converter 22 is at a lower temperature than that in the first circuit configuration, and an adverse effect on a service life of the second power converter 22 can be suppressed. In this manner, the service life of the first power converter 21 and that of the second power converter 22 are more balanced.

Next, the controller 50 determines whether or not the first temperature detection value T1 (indicative of the inverter temperature) exceeds the first temperature threshold (Step S107). When the first temperature detection value T1 is equal to or less than the first temperature threshold, the controller 50 repeats the process of Step S107.

When the first temperature detection value T1 exceeds the first temperature threshold, the controller 50 determines whether or not the car 11 is stopped (Step S109). Whether or not the car 11 is stopped can be determined based on whether or not the electric power generator 5 is stopped. When the electric power generator 5 is not stopped (e.g., when the car 11 is moving), the controller 50 repeats the process of Step S109.

When the electric power generator 5 is stopped, the first circuit configuration is achieved by the controller 50 (Step S111). Specifically, the normal contacts N1 and N2 are switched on, the switching contacts E1 to E3 are switched off, the first signal switch S1 is switched to the second power converter 22 side, and the second signal switch S2 is switched to the first power converter 21 side. That is, the controller causes the first power converter 21 to switch from the inverter to the regenerative converter. Thus, the first power converter 21 is ready to operate as the regenerative converter, and the second power converter 22 is also ready to operate as the inverter.

As described above, when the second circuit configuration is achieved, and the first temperature detection value T1 exceeds the first temperature threshold, and the electric power generator 5 is stopped, the switching means of the control device 100 can operate to achieve the first circuit configuration. Any other conditions can be added in accordance with specific control thereof.

After that, the processing returns to Step S101. When a call is made in this state, the first power converter 21 operates as the regenerative converter to receive power from the AC power supply e, and the second power converter 22 operates as the inverter to drive the electric power generator 5.

As described above, the control device 100 according to the first embodiment of the present invention allows the first power converter 21 and the second power converter 22 to switchingly operate as the inverter or the regenerative converter, and hence a difference in service life between the two power converters can be reduced.

In the first embodiment, the wide bandgap semiconductor is adopted for the switching elements of the first power converter 21 and the second power converter 22. The wide bandgap semiconductor allows a high withstand voltage and a high permissible current density, and hence each switching element can be made compact. In addition, the compact switching elements contribute to downsizing of the first power converter 21 and the second power converter 22, and further to downsizing of the control device 100 or the entire power conversion device.

Second Embodiment

In the first embodiment, the controller 50 operates based on the first temperature threshold alone. In a second embodiment, the controller 50 is configured to store a second temperature threshold as well as the first temperature threshold. The second temperature threshold is smaller than the first temperature threshold. A description is given below of differences from the first embodiment.

Figure 3:
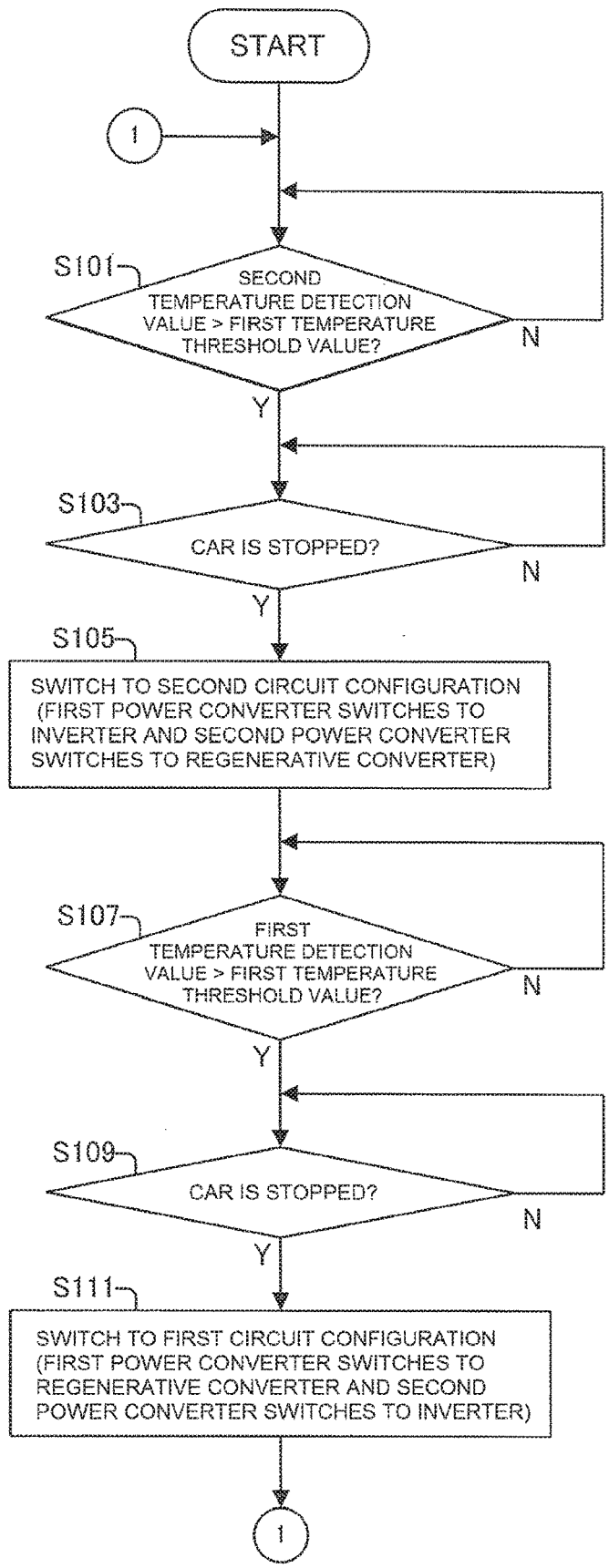
FIG. 3 is a flowchart for illustrating a processing flow of a second embodiment of the present invention.

FIG. 3 is a flowchart for illustrating a processing flow executed by the controller 50 of the second embodiment. The processing flow of the flowchart is executed, for example, when the first circuit configuration is achieved.

First, the controller 50 determines whether or not the first temperature detection value T1 (indicative of the regenerative converter temperature) is below the second temperature threshold (Step S201). When the first temperature detection value T1 is equal to or more than the second temperature threshold, the controller 50 repeats the process of Step S201.

An operation (i.e., Step S203 to Step S211) executed when the first temperature detection value T1 is below the first temperature threshold can be carried out similarly to the corresponding operation (i.e., Step S103 to Step S111) of the first embodiment.

As described above, in the second embodiment, the switching means operates based on the first temperature detection value T1. For example, the switching means selectively achieves the first circuit configuration and the second circuit configuration based on the first temperature detection value T1. Further, in the second embodiment, the switching means (especially, the determination unit 52 of the controller 50) is configured to store a predetermined temperature threshold (i.e., the first temperature threshold) used for control of the circuit configuration.

As described above, similarly to the first embodiment, the control device 100 according to the second embodiment of the present invention allows the first power converter 21 and the second power converter 22 to switchingly operate as the inverter or the regenerative converter, and hence a difference in service life between the two power converters can be reduced.

Further, in the second embodiment, since the second temperature detection value T2 is not used, the second temperature detector 32 and its associated configuration can be omitted to simplify the entire configuration.

As a modification example thereof, the control device 100 (especially, the determination unit 52 of the controller 50) can operate based on the second temperature detection value T2, instead of operating based on the first temperature detection value T1. In this case, the first temperature detector 31 and its associated configuration can be omitted.

In the second embodiment as well, the wide bandgap semiconductor is adopted for the switching elements of the first power converter 21 and the second power converter 22, and hence the switching elements, the first power converter 21, the second power converter 22, the control device 100, or the entire power conversion device can be downsized.

Note that, in the first and second embodiments, the switching means of the control device 100 controls the circuit configuration based on the temperature. As a modification example, however, the switching means can control the circuit configuration based on other information (e.g., elapsed time).

The invention claimed is:

1. A control device for an elevator, comprising:
a first power converter;
a second power converter; and
a switcher,
the first power converter being operable as a regenerative converter,
the first power converter being operable as an inverter,
the second power converter being operable as a regenerative converter,
the second power converter being operable as an inverter,
the regenerative converter having a function of converting power to DC power and a function of converting DC power to power,
the inverter having: a function of converting DC power to AC power; a function of supplying the AC power to an electric power generator; a function of receiving regenerated power from the electric power generator; and a function of converting the regenerated power to DC power,
the switcher being configured to selectively achieve:
a first circuit configuration that causes the first power converter to operate as the regenerative converter, and also causes the second power converter to operate as the inverter; and
a second circuit configuration that causes the second power converter to operate as the regenerative converter, and also causes the first power converter to operate as the inverter.

2. The control device for an elevator according to claim 1, wherein the control device further comprises a first temperature detector configured to measure a temperature of the first power converter or a second temperature detector configured to measure a temperature of the second power converter, and
wherein the switcher is configured to selectively achieve the first circuit configuration and the second circuit configuration based on the first temperature or the second temperature.

3. The control device for an elevator according to claim 2, wherein, when:
the second circuit configuration is achieved;
the first temperature exceeds a first temperature threshold; and
the electric power generator is stopped, the switcher operates so as to achieve the first circuit configuration, or wherein, when:

the first circuit configuration is achieved;

the second temperature exceeds the first temperature threshold; and the electric power generator is stopped, the switcher operates so as to achieve the second circuit configuration.

4. The control device for an elevator according to claim 1, wherein at least one of the first power converter or the second power converter comprises a switching element including a wide bandgap semiconductor.

5. The control device for an elevator according to claim 2, wherein at least one of the first power converter or the second power converter comprises a switching element including a wide bandgap semiconductor.

6. The control device for an elevator according to claim 3, wherein at least one of the first power converter or the second power converter comprises a switching element including a wide bandgap semiconductor.

7. The control device for an elevator according to claim 1, wherein the switcher includes a first controllable contact configured to electrically connect and electrically disconnect the first power converter from the electric power generator, and a second controllable contact configured to electrically connect and disconnect the second power converter from the electric power generator.

* * * * *